July 2, 1968 L. K. BELL 3,391,317
REBALANCEABLE CONTROL APPARATUS HAVING TRANSIENT SENSITIVITY ADJUSTMENT
Filed April 12, 1965
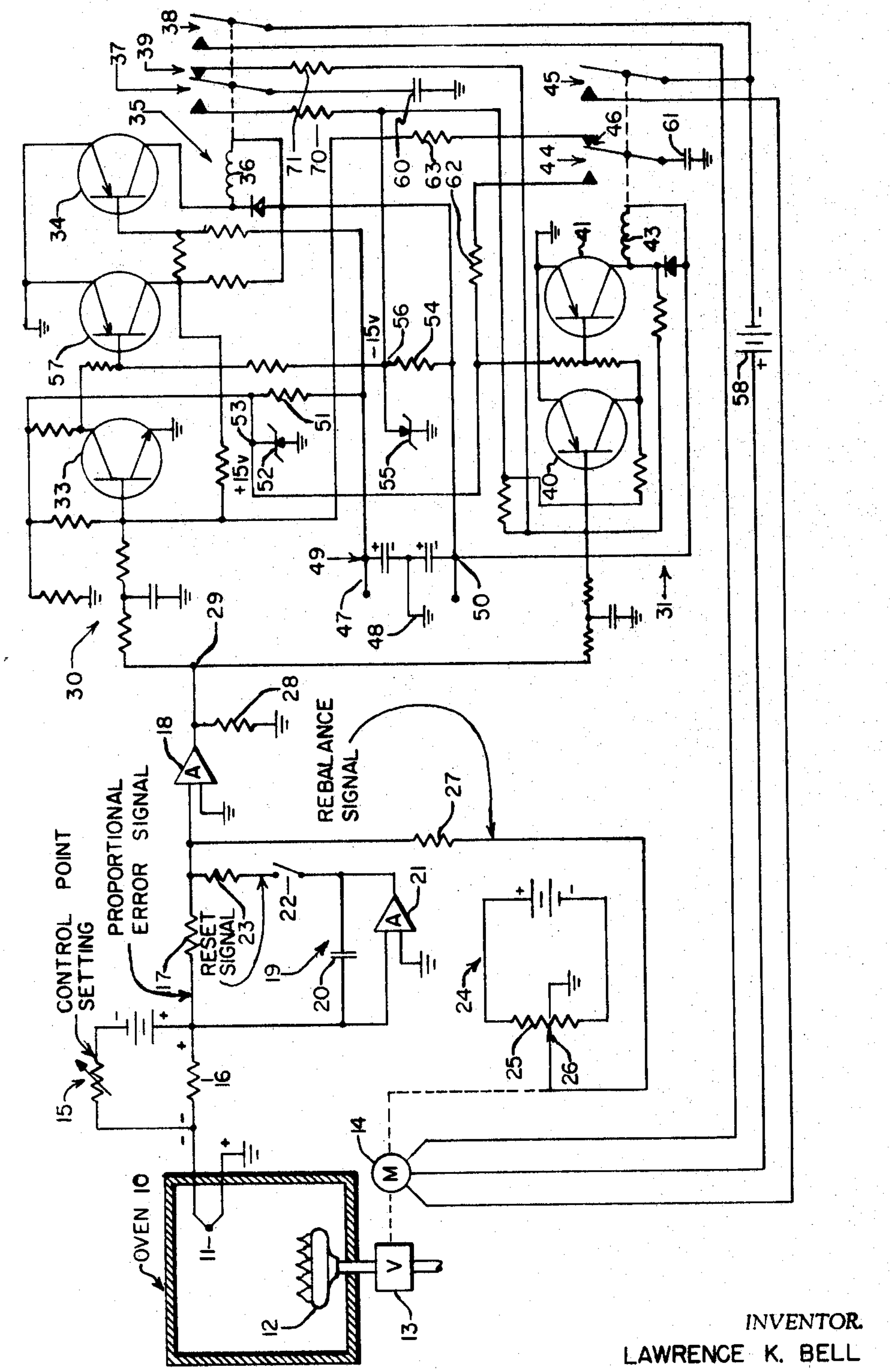
INVENTOR.
LAWRENCE K. BELL
BY Francis A. Sirr
ATTORNEY United States Patent Office 3,391,317

Patented July 2, 1968

3,391,317

REBALANCEABLE CONTROL APPARATUS HAVING TRANSIENT SENSITIVITY ADJUSTMENT

Lawrence K. Bell, Minneapolis, Minn., assignor to Honeywell Inc., Minneapolis, Minn., a corporation of Delaware Filed Apr. 12, 1965, Ser. No. 447,424
8 Claims. (Cl. 318—18)

ABSTRACT OF THE DISCLOSURE

A rebalancing control apparatus having a first signal channel and output relay which is responsive to a positive error signal, a second signal channel and output relay which is responsive to a negative error signal, each channel having associated therewith a capacitor which is charged when that channel's relay is energized, the subsequent deenergization of that relay connecting the now-charged capacitor to the other channel to temporarily desensitize the other channel as the capacitor discharges.

This invention is concerned with an improved control apparatus and particularly with a control apparatus having a new and a unique method for providing the optimum in sensitivity of the control apparatus without the usual attendant instability and hunting of the output actuator.

My invention is specifically related to a control apparatus having first and second signal channels, the inputs of which are connected to a common input signal source adapted to provide signals of a first or a second characteristic. The two signal channels are responsive respectively to signals of the first or the second characteristic and provide two independent outputs, depending upon the characteristic of input signal which is being received. In the standby condition of operation, the sensitivity level of both of the signal channels is substantially equal. Therefore, the origination of an input signal of either the first or the second characteristic causes one or the other of the outputs to be actuated. Actuation of this output is effective to, in one manner or another, reduce the input signal to reduce it below the threshold of sensitivity of that channel which was actuated. At this point, the novel structure of my invention originates a transient reduction in sensitivity of the other channel, that is the channel which was not just previously active to reduce the input signal. In this manner, should the input signal over-shoot and actually reverse characteristic, the second channel will not respond to this overshoot and thus hunting of the output actuator is avoided. It is important to note that the reduction in sensitivity is only a transient reduciton, and after a short time period the sensitivity of both channels again is substantially equal.

While I have utilized the term sensitivity, the above concept may be described using the term "dead band." Essentially what I have originated is a structure which provides a balanced dead band about what may be called a zero signal value for the standby condition of the apparatus. However, upon the apparatus responding to a signal of one sense or the other, and upon a rebalance of this signal being achieved, the dead band is shifted to increase the dead band zone for that channel which did not previously respond to the occurrence of an input signal.

More specifically, I provide a first and a second polarity sensitive electronic amplifier signal channel, each channel being connected to a common input terminal, and each channel having a separate output switching relay. Upon the occurrence of an error signal of the given polarity, one of the channels actuates its output relay, to introduce a control effect, effective to wipe out this error signal. At the same time, a capacitor is charged. Subsequently, upon the error signal being reduced, the output relay is deenergized and this charged capacitor is connected to the amplifier of the other channel to reduce the sensitivity of this other channel. Therefore, should the control effect which is introduced by energization of the first relay produce a momentary over-shoot or polarity reversal in the error signal, the control apparatus does not respond to this momentary over-shoot. Thus, the structure of my invention provides a control apparatus with high sensitivity and with a minimum response to over-shoot and with no response at all to this over-shoot should it be a transient over-shoot.

My invention will be apparent to those skilled in the art upon reference to the following specification, claims, and drawings, of which the single figure is a schematic representation of my invention.

In the single figure I disclose my invention in the environmment of a thermocouple temperature controller adapted to control a modulating valve through the medium of a reversible DC motor.

Reference numeral 10 designates an oven having located therein a thermocouple 11 and a burner 12 supporting a flame. The heat generated by the flame is controlled by the degree of opening of a valve 13 controlled from a reversible DC motor 14, as will be described.

Reference numeral 15 designates generally a control point setting network in which a voltage in opposition to the voltage of thermocouple 11 is derived across a resistor 16. The resulting voltage, which is the sum of the voltage across resistor 16 and the voltage generated by thermocouple 11, is provided through summing resistor 17 as a proportional error signal to the input of an amplifier 18.

Reference numeral 19 designates generally a reset generating network having a capacitor 20 connected in parallel with an amplifier 21 and through a manual switch 22 and a summing resistor 23 to the input of amplifier 18. Network 19 is effective to integrate the proportional error signal and to generate a signal of the same polarity as the error signal and whose magnitude increases as an integrated effect of the error signal.

Reference numeral 24 designates a rebalance network having a potentiometer 25 whose movable tap 26 is connected to be driven by operation of motor 14 and to provide a rebalance signal through summing resistor 27 to the input of amplifier 18.

The output of amplifier 18 is provided across resistor 28 and this resistor is connected to the input terminal 29 of a first signal channel 30 and a second signal channel 31.

Prior to a description of the detailed construction of the signal channels or amplifiers 30 and 31, it should be explained that a departure in the temperature of oven 10 from the temperature as set by control point setting network 15 is effective to originate a proportional error signal at the input of amplifier 18. This proportional error signal is effective to cause motor 14 to be driven in a direction to restore the temperature of oven 10. This movement of motor 14 is effective, by virtue of the rebalance signal, to wipe out the proportional error signal. Furthermore, should the manual switch 22 be closed, the reset network 19 is effective to originate a reset signal of a polarity to aid the proportional error signal. This general function is well known and will not be described in detail.

Turning now to signal channel 30, this signal channel includes transistors 33, 57 and 34, transistor 34 having a relay 35 connected in circuit therewith. Reraly 35 includes a winding 36, normally open switches 37 and 38, and normally closed switch 39.

Signal channel 31 includes transistors 40 and 41, transistor 41 having a relay 42 connected in circuit therewith. Relay 42 includes a winding 43, normally open switches 44 and 45, and normally closed switch 46.

Reference numeral 47 designates a source of voltage, only partially represented, as a pair of capacitors which are connected through a rectifying network, not shown, to a source of AC voltage. This structure is effective to originate a ground reference terminal 48, a positive voltage terminal 49 of approximately 20 volts, and a negative voltage terminal 50 of approximately 20 volts. Terminal 49 is connected through resistor 51 and a Zener diode 52 to provide a positive voltage terminal 53 of 15 volts. Terminal 50 is connected through a resistor 54 and a Zener diode 55 to provide a negative voltage terminal 56 of 15 volts. The terminals 49, 50, 53 and 56 provide the voltage supply terminals for the various transistors of the two signal channels.

By virtue of the various biasing circuits, transistors 33 and 57 are normally conductive while transistor 34 is normally nonconductive, and transistor 40 is normally conductive while transistor 41 is normally nonconductive.

By the term "normal" I refer to the mode of operation in which the voltage developed across resistor 28 at the output of amplifier 18 is zero or of such a low magnitude that it is below the threshold of sensitivity of the two signal channels 30 and 31 and therefore the two output relays 35 and 42 remain deenergized. In this condition, transistors 33, 57 and 40 are conductive and are saturated. Transistor 33 is the input transistor of signal channel 30 and this transistor responds to a negative signal at terminal 29, this negative signal being connected to the base-to-emitter circuit of transistor 33 to render this transistor less conductive, and by way of a switching action, to suddenly switch transistors 33 and 57 to a non-conductive state and to switch transistor 34 to a conductive state to energize the winding of relay 35.

Transistor 40 is the input transistor of signal channel 31 and this transistor is responsive to a positive voltage at terminal 29. This positive voltage is effective to switch transistor 40 to a nonconductive state and to switch transistor 41 to a conductive state to thus energize the winding of relay 42.

Referring to thermocouple 11, the polarity of the two leads of this thermocouple have ben labeled. This voltage is of a variable magnitude, depending upon the temperature of oven 10. If it is assumed that the oven drops in temperature, then the voltage of control point setting structure 15 predominates and a positive voltage is applied to terminal 29. This positive voltage is effective to energize the winding of relay 42 and switch 45 closes connecting two of the three leads of motor 14 to a source of D.C. voltage 58 in a manner to drive modulating valve 13 in a direction open to thereby increase the temperature of oven 10.

Conversely, should the oven overheat, a negative voltage is applied to terminal 29 and relay 35 is energized to cause motor 14 to move in the opposite direction. As has been mentioned, rotation of motor 14 is effective to originate a rebalance signal at the input of amplifier 18.

A preferred emhbodiment of my invention can be understood upon reference to the functioning of capacitors 60 and 61 associated with the output relays 35 and 42 of the signal channels 30 and 31 respectively. Generally speaking, these capacitors, and the switch contacts with which they are associated, provide a function whereby one channel, upon achieving its control function, is effective to momentarily reduce the sensitivity of the other channel. It is important to note that this reduction in sensitivity occurs only a momentary fashion and only upon a correction or rebalance having been achieved.

Referring again to the above assumption wherein it was assumed that oven 10 cools below the point required by the control point setting network 15, in this case relay 42 is energized. Energization of relay 42 closes its switch contacts 44 and capacitor 61 is connected from the ground reference terminal through a resistor 62 to the power supply terminal 53. The capacitor is now charged with its upper plate positive. Subsequently, upon a rebalance being achieved, the error signal at terminal 29 is reduced below the threshold level of sensitivity of signal channel 31 and relay 42 is deenergized. The charged capacitor 61 is now connected through resistor 63 to the input terminals of normally conducting transistor 33. The polarity of voltage present on capacitor 61 is such as to maintain transistor 33 conductive and render this transistor insensitive to an over-shoot or reversal in polarity of the voltage present at input terminal 29. Should a negative voltage be generated at terminal 29, in a transient fashion, due to over-shoot or the like, this negative voltage is ineffective to render transistor 33 nonconductive. Should this negative voltage persist, beyond the discharge time of capacitor 61, then relay 35 is energized to drive motor 14 in the opposite direction from that which it was driven due to energization of relay 42.

Likewise, should the temperature of oven 10 become too high, channel 30 responds to energized relay 35. Capacitor 60 is now connected through a resistor 70 to the negative supply terminal 56 to thus charge the capacitor with its upper plate negative. Subsequently, upon rebalance of the system to wipe out the signal present at terminal 29, relay 35 is deenergized. Charged capacitor 60 is now connected through switch 39 and a resistor 71 to the input electrodes of transistor 40. The polarity of the voltage on capacitor 60 is such as to maintain transistor 40 conductive and to render this transistor momentarily insensitive to a positive signal at input terminal 29. Should a positive voltage persist beyond the discharge time of capacitor 60, relay 42 will be energized to again rebalance.

While I have disclosed a preferred embodiment of my invention, it is to be noted that within the broad teachings of my invention other modifications will be apparent to those skilled in the art. An essential feature of my invention is that the output of one of the signal channels 30 and 31, upon a rebalance being achieved, is effective to momentarily increase the dead band, or reduce the sensitivity, of the other signal channel without affecting the dead band or sensitivity of the one signal channel, to prevent response to the other channel to an over-shoot in the error signal which may be derived from functioning of the first signal channel, as by the presence of a reset signal at the input of amplifier 18.

Since other modifications of my invention will be apparent to those skilled in the art, it is intended that the scope of my invention be limited solely by the scope of the appended claims.

I claim as my invention:

1. Control apparatus having input means adapted to receive an input signal of a first or an opposite sense and to actuate first or second output means in response thereto, said output means when actuated being effective to initiate a control effect to eliminate said input signal, the improvement comprising;

sensitivity means connected to the input means and controlled by said first and second output means to provide a transient reduction in the sensitivity of the control apparatus to *only* a signal of said first first or said opposite sense when the control apparatus has previously responded to and eliminated a signal of said opposite or said first sense respectively.

2. Control apparatus having input means responsive to input signals of a first or a second sense which are indicative of variations in a physical condition which occur in a first or a second sense from a nominal condition, and having first and second output means which are actuated in response to input signals of the first or second sense respectively and are effective to institute a condition changing effect to restore the physical condition to the nominal condition, the improvement comprising:

first and second means operatively associated with said input means, controlled by said first and second output means respectively, and effective upon restoration of the physical condition to the nominal condition to momentarily render the control apparatus substantially insensitive to an input signal of *only* a sense which is effective to actuate the other of said output means.

3. Electrical signal responsive control apparatus having input terminals adapted to be connected to a signal source which provides a signal of a first or a second characteristic as a physical condition varies in a first or a second sense from a nominal value, and having first and second output means responsive to a signal of a first or second characteristic respectively, said first and second output means being adapted to institute condition changing effects to restore the physical condition to the nominal value, the improvement comprising;

electrical means connected to the control apparatus and controlled by said first and second output means and effective upon the restoration of the physical condition to the nominal value to provide a transient reduction in the sensitivity of the control apparatus to *only* a signal of a characteristic other than that which previously instituted the condition changing effect.

4. Control apparatus comprising;

a first signal channel responsive to an input signal of a first characteristic, a second signal channel responsive to an input signal of a second characteristic, first output means controlled by said first signal channel, second output means controlled by said second signal channel, and sensitivity control means having a transient control effect, connected in controlling relation to said first and second signal channels and controlled by said first and second output means to effect a transient reduction in the sensitivity of *only* one of said channels upon the interruption of a signal of a characteristic to which the other channel is responsive.

5. Control apparatus comprising;

first and second electrical signal channels, the first of which is responsive to a signal of a first polarity and the second of which is sensitive to a signal of an opposite polarity, first and second output means controlled by said first and second signal channels respectively to be actuated upon the presence of a signal of said first or said opposite polarity, terminal means connected to said signal channels and adapted to be connected to a signal source of reversible polarity, and sensitivity control means connected in controlling relation to said signal channels and controlled by said output means to provide a momentary reduction in sensitivity to *only* one of said signal channels upon the interruption of a signal of a polarity to which the other of said signal channels is responsive.

6. Control apparatus comprising;

a first and second signal channel having a common input signal source of reversible signal characteristic, separate output means, and means rendering said signal channels individually responsive to signals of opposite characteristic, said signal channels normally having substantially equal dead band characteristics, and means controlled by said output means and responsive to the interruption of a signal of one characteristic to momentarily increase the dead band characteristic of *only* the signal channel which is responsive to a signal of the opposite characteristic.

7. Control apparatus for use with a source of DC input of reversible polarity, comprising;

first and second DC signal responsive amplifier channels having first and second relay output means respectively, said first and second channels being constructed and arranged to be responsive to DC signals of a first and an opposite polarity respectively, capacitive means controlled by said first and second relay output means to be charged upon the presence of a DC signal of said first or said opposite polarity respectively, and sensitivity control means controlled upon the subsequent absence of such a DC signal to connect said charged capacitive means to reduce the sensitivity of *only* the inactive one of said signal channels.

8. Control apparatus for use with a source of DC signal voltage of reversible polarity, the polarity being indicative of the departure of a physical condition in one sense or the other from a nominal value, and in which condition changing means is actuated to restore the condition to the nominal value, the apparatus comprising;

a first and a second voltage responsive signal channel each having input means, each being constructed and arranged to be individually responsive to DC signal voltages of opposite polarity, and each having output switch means to be actuated from a first to a second condition upon the occurrence of a DC signal voltage to which the signal channel is responsive, means adapted to connect the input means of said first and second signal channels to the source of DC signal voltage, first and second capacitive means, and circuit means controlled by the output switch means of said first and second signal channel when in said second condition to selectively charge one of said capacitive means upon the occurrence of a DC signal voltage and subsequently upon returning to said first condition to connect said one charged capacitive means to the one of said signal channels which did not respond to the DC signal voltage, to momentarily reduce the sensitivity thereof.

References Cited

UNITED STATES PATENTS

| | | | |
|---|---|---|---|
| 2,712,623 | 7/1955 | Yosano | 318—448 XR |
| 2,860,298 | 11/1958 | Carlson | 318—448 |
| 2,995,101 | 8/1961 | Jones | 318—448 XR |

BENJAMIN DOBECK, *Primary Examiner.*